(12) United States Patent
Pezzati et al.

(10) Patent No.: US 8,177,078 B2
(45) Date of Patent: May 15, 2012

(54) EYEGLASSES RETAINER FOR HANDLE BARS

(76) Inventors: Michael Pezzati, Santa Barbara, CA (US); Kenneth Acklin, Santa Barbara, CA (US)

( * ) Notice: Subject to any disclaimer, the term of this patent is extended or adjusted under 35 U.S.C. 154(b) by 168 days.

(21) Appl. No.: 12/455,543

(22) Filed: Jun. 3, 2009

(65) Prior Publication Data
US 2010/0307994 A1   Dec. 9, 2010

(51) Int. Cl.
*A47F 7/02* (2006.01)
(52) U.S. Cl. ....... 211/85.1; 211/85.7; 248/902; 24/3.12; 224/420; 224/545
(58) Field of Classification Search ............... 211/85.1, 211/85.7; 188/24.22; 248/902, 226.11, 230.1; 206/5–6; 24/3.12, 3.3, 3.8; 224/419, 420, 224/440, 545, 549
See application file for complete search history.

(56) References Cited

U.S. PATENT DOCUMENTS

| | | | | |
|---|---|---|---|---|
| 2,454,732 A * | 11/1948 | Cathey et al. | | 224/418 |
| 4,005,613 A * | 2/1977 | Kaufman et al. | | 74/489 |
| 4,930,740 A * | 6/1990 | Vogt | | 248/309.1 |
| 5,005,674 A * | 4/1991 | Piatt | | 188/24.11 |
| 5,392,669 A * | 2/1995 | Li | | 74/502.2 |
| 5,564,311 A * | 10/1996 | Chen | | 74/489 |
| 5,788,020 A * | 8/1998 | Tseng | | 188/24.12 |
| 5,803,328 A * | 9/1998 | Nakahara | | 224/420 |
| 5,845,539 A * | 12/1998 | Huang | | 74/489 |
| D405,407 S * | 2/1999 | Irvine | | D12/179 |
| 5,887,486 A * | 3/1999 | Lin et al. | | 74/489 |
| 6,193,030 B1 * | 2/2001 | Kuo | | 188/344 |
| 6,206,258 B1 * | 3/2001 | Calder | | 224/420 |
| 6,216,825 B1 * | 4/2001 | Hung | | 188/24.22 |
| 6,321,784 B1 * | 11/2001 | Leng | | 137/571 |
| 6,374,694 B1 * | 4/2002 | Chen | | 74/502.2 |
| 6,637,074 B1 * | 10/2003 | Morris | | 24/3.12 |
| 6,725,978 B2 * | 4/2004 | Karpowich | | 188/20 |
| 7,121,386 B1 * | 10/2006 | Eineke | | 188/24.16 |
| 7,270,241 B2 * | 9/2007 | Nobili | | 211/85.1 |
| 2002/0092375 A1 * | 7/2002 | Yao | | 74/523 |
| 2002/0104401 A1 * | 8/2002 | Dal Pra | | 74/502.2 |
| 2003/0230457 A1 * | 12/2003 | Matsueda | | 188/24.11 |
| 2004/0112685 A1 * | 6/2004 | Cotsonas | | 188/2 D |
| 2005/0241427 A1 * | 11/2005 | Tsai | | 74/502.2 |
| 2006/0070480 A1 * | 4/2006 | Fujii | | 74/502.2 |
| 2006/0243543 A1 * | 11/2006 | Tsai | | 188/24.22 |
| 2006/0266595 A1 * | 11/2006 | Nago | | 188/24.22 |
| 2007/0051567 A1 * | 3/2007 | Matsueda et al. | | 188/24.22 |
| 2007/0051575 A1 * | 3/2007 | Lumpkin | | 188/344 |
| 2007/0164534 A1 * | 7/2007 | Simon | | 280/242.1 |
| 2008/0173231 A1 * | 7/2008 | Tsai | | 116/152 |
| 2009/0200119 A1 * | 8/2009 | Tsai | | 188/24.22 |
| 2009/0301252 A1 * | 12/2009 | Hsu | | 74/489 |
| 2010/0236469 A1 * | 9/2010 | Tsai | | 116/167 |

* cited by examiner

*Primary Examiner* — Darnell Jayne
*Assistant Examiner* — Devin Barnett
(74) *Attorney, Agent, or Firm* — Mark Rodgers

(57) ABSTRACT

An eyeglass retainer for handle bars, including two spring-loaded pivot arms, attached to the handlebars with the pivot ends toward the stem, such that the pivot arms retail the temple pieces of the sunglasses with the temple pieces extending below the handlebars and the nosepiece of the glasses resting on the stem or stem connecting piece.

4 Claims, 2 Drawing Sheets

EYEGLASSES RETAINER FOR HANDLE BARS

RELATED APPLICATIONS

Not Applicable

FEDERALLY SPONSORED RESEARCH

Not Applicable

SEQUENCE LISTING

Not Applicable

BACKGROUND OF THE INVENTION

This application relates to retaining eyeglasses on the handlebars of a bicycle or other vehicle with handlebars.

In the course of a bicycle ride, it is often the case that the rider may want to have eyeglasses on, for example sunglasses, for some portion of a ride, but not for others. Sunglasses for example may come on and off repeatedly over the course of a ride, due to changes in light and shadow, or if the cyclist stops and goes into darker surroundings.

The inventors, avid cyclists, have observed that it is inconvenient or even unsafe to either keep glasses on when it is not bright or not be able to conveniently access sunglasses when conditions require them. Currently eyeglasses are stored in pockets, packs or cycle mounted storage such as saddle bags or baskets. Most cyclists have observed that such storage of eyeglasses does not facilitate easy and quick access to the glasses when needed, or convenient retention when not. The inventors, whose business it is to provide cycling accessories, have determined no truly suitable glasses retainer for bicycles or other vehicles with handlebars, exists. It is the object of this invention to provide a practical eyeglass retention system for handlebar vehicles.

BRIEF SUMMARY OF THE INVENTION

The invention is a system providing easy storage and removal of eyeglasses on handle bars, which includes two pivoting arms, spring-loaded at the pivot end, and at least one clamp, with the pivot ends of the arms clamped to the handle bars and the pivot ends adjacent to and on opposite sides of the handle bar stem. The arms are preferably arranged substantially parallel to and on the lower half of the handle bars facing the stem with the spring action pulling the arms to the handle bars. The eyeglasses are stored by slipping the temple pieces between the arms and the handle bars and resting the nose piece on the stem or stem cross piece with the nose piece above the pivot arms and the temple pieces extending below the handle bars.

In one embodiment, each pivoting arm is attached to a clamp, and each clamp is attached separately to the handle bars. In one version, the clamp includes a curved surface and a slit extending through the clamp, and a cable tie is passed through the slit and around the handlebars to secure the curved surface to the handlebars. In another version, the clamp is made of two curved surfaces, and the curved surfaces are placed opposed to each other around the handle bars and secured together tightly with at least one fastener.

In other embodiments, the invention is a system and a method providing easy storage and removal of eyeglasses on handle bars, utilizing two temple piece retainers disposed on the underside of the handlebars, on adjacent and opposite sides of a handlebar stem, wherein eyeglasses may be stored by slipping the temple pieces into the retainers on each side of the stem and resting the nose piece on the stem with the nose piece above the stem and the temple pieces extending below the handle bars.

BRIEF DESCRIPTION OF THE DRAWINGS

The invention will be better understood by referring to the following figures.

DETAILED DESCRIPTION OF THE INVENTION

In the broadest sense, the invention is a system for providing a three-point mount for eyeglasses on handlebars. In this disclosure "handlebars" refers to the bars extending out from the center and "stem" refers to the piece which connects the bars to the steering column. Many arrangements of bars exist which are compatible with the invention, and the nomenclature is not consistent. Thus "handlebar" and "stem" should be accorded a broad interpretation, specifically "stem" refers to any part of the vehicle which is disposed substantially in the region of the steering column and the bars and rotates with the bars. The system includes two retainers, one on each side of the stem, and mounted adjacent to the stem. These retainers are disposed to accept the eyeglass temple pieces and retain them on the lower side of the bars with the temple pieces extending away and down from the bars, and the nosepiece of the eyeglasses resting on the top of the stem in a three point over-under arrangement. A particular preferred embodiment of the retainers is described in FIG. 1. However the inventors have experimented with several retainer implementations, including foam sandwich retainers, loop retainers and others.

Figure 1:
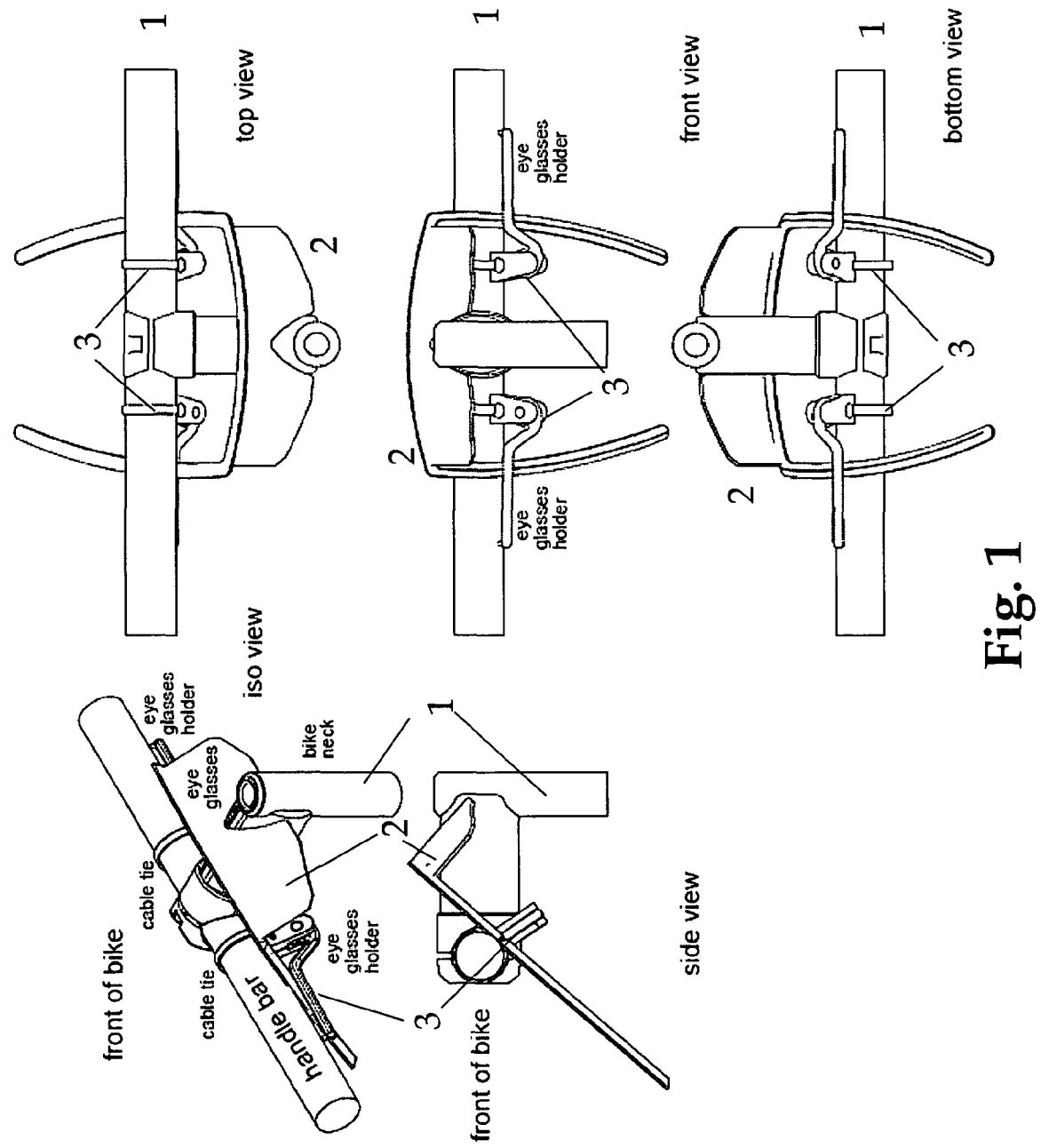
FIG. 1 shows five views of a preferred embodiment of the invention in actual use.

Referring to FIG. 1, a preferred embodiment of the invention is shown. An exemplary handle bars arrangement is denoted at 1. Typically handle bars are attached by way of a stem or connecting piece extending forward from the steering column or neck. Such a typical arrangement is shown in the Figure. The novel retaining system is used to retain eyeglasses 2 to the handlebars 1 by way of two retention elements 3.

Figure 2:
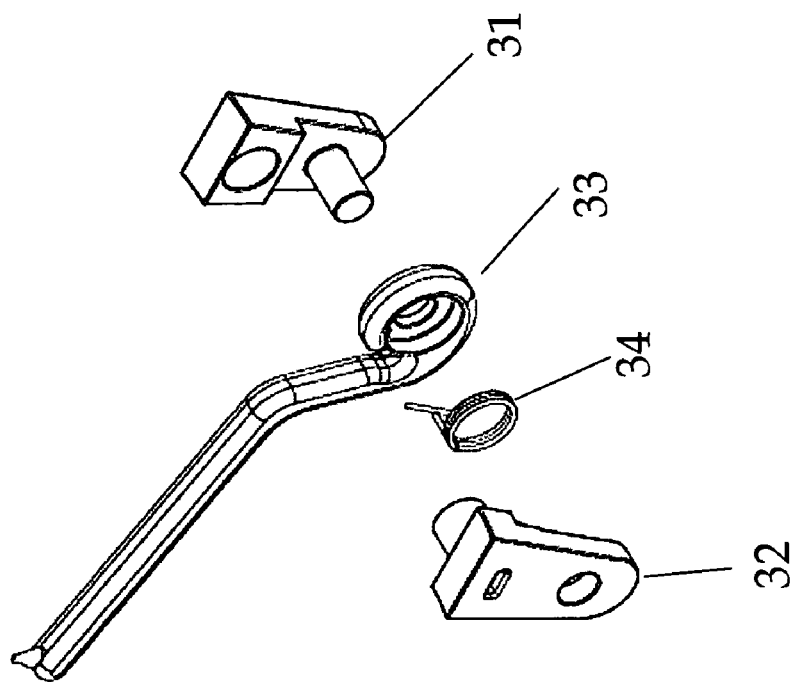
FIG. 2 shows the details of the clamping mechanism of the preferred embodiment
Figure 2:
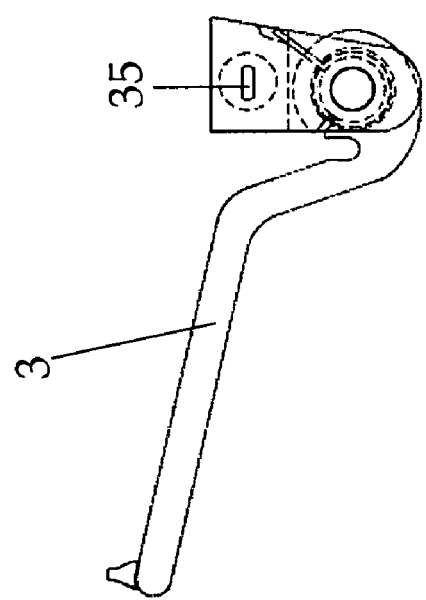

Referring to FIG. 2, an exemplary retention element 3 is shown. Pivot arm 33 is mated with a circular spring 34 and held by bracket pieces 31 and 32, such that when arm 33 is pivoted down, spring 34 acts to provide a return force. Thus assembly 3 is a spring-loaded pivot arm. When assembled the top surfaces of mated pieces 31 and 32 are preferably curved to mate with a handle bar. In the preferred embodiment, a slit 35 extends though the assembly near the top surface of the assembly 3. This slit accommodates a cable tie that is passed through the slit and fastens the assembly to a handle bar by wrapping around the handle bar tightly such that the top surface of the assembly is held to the handle bar. Thus when installed on the handle bar, the pivot arm is held with it's end and part of it's length against the long axis of the handle bar, and if the arm is pulled away from the bar, spring 34 provides a force pulling the arm back to the handle bar. Although the exact dimensions of the pieces is not critical, the inventors have found that an arm a few inches long (1-4) is suitable.

Referring back to FIG. 1, two retention elements 3 are installed, substantially in line, on the handle bars, one on each side of the handle bar center, with the pivot ends near the handle bar center and the arms extending toward the two handle bar ends. Again the position is not critical, as long as the pivot ends are well within a typical eyeglasses temple piece width. It is preferable that the pivot arms are on the lower half of the handle bars. In this position, the eyeglasses 2 temple pieces are slipped between the handle bars and the pivot arms and are thus held against the bars. The nosepiece of the eyeglasses 2 rests on the stem as shown. If the arms are on the lower half of the bars, the temple pieces extend below the bars and the nose piece rests above the bars, such that this over-under position minimizes the chance that any small slippages of the glasses will lead to the glasses coming loose.

The inventors have prototyped the system, and have verified that the glasses are easy to install and remove, and in fact can be installed and removed with one hand during riding if desired. Yet even the roughest terrain and vigorous shaking of the bicycle has not caused any tested eyeglasses to come loose. Thus the invention has solved a long-standing inconvenience associated with cycling.

Variations of the tested embodiment will occur to a skilled practitioner and should be considered within the scope of the invention. For instance the cable tie clamp could be replaced with other clamping mechanisms such as the two-piece curved tube clamp common to many bicycle accessories. Also, although the use of two pivot arms is preferable, the two arms could be attached to a single clamping unit as opposed to the separate retention units as shown in the exemplary embodiment. And it is possible, although not as desirable to retain the temple pieces to the top half of the handle bars as opposed to the arrangement shown.

Although the example of bicycle handle bars is used, obviously the invention applies to other vehicle that might use a similar handle bar geometry such as motorcycles and scooters, landscaping equipment and the like.

We claim:

1. A system providing easy storage and removal of eyeglasses with temple pieces and a nose piece on handle bars and a stem of a bicycle, comprising:

a first temple piece retention element, comprising; a pivoting arm pivoting about a pivot end, spring-loaded at the pivot end, and a handle bar clamp, clamped on the handle bars on one side of the stem with the pivot end near the stem and the pivot arm parallel to the handlebars on the lower half of the handlebars and the pivot arm spring force biases the pivot arm toward the handlebars to retain the temple pieces of the eyeglasses between the handlebar and pivot arm; and, a second temple piece retention element, comprising; a pivoting arm pivoting about a pivot end, spring-loaded at the pivot end, and a handle bar clamp, clamped on the handle bars on the other side of the stem with the pivot end near the stem and the pivot arm parallel to the handlebars on the lower half of the handlebars and substantially in line with the pivot arm of the first temple piece retention element and the pivot arm spring force biases the pivot arm toward the handlebars to retain the temple pieces of the eyeglasses between the handlebar and pivot arm; wherein, the two temple piece retention elements are placed relative to the stem for the pivot arms to be spaced apart to accommodate the width of eyeglasses and when installed the eyeglass temple pieces are held below the handle bars and the nosepiece rests above the handlebars.

2. The system of claim 1 wherein each pivoting arm is attached to a clamp, and each clamp is attached separately to the handle bars.

3. The system of claim 1 wherein the clamp comprises a curved surface and a slit extending through the clamp, wherein a cable tie is passed through the slit and around the handlebars to secure the curved surface to the handlebars.

4. The system of claim 1 wherein the clamp comprises two curved surfaces, wherein the curved surfaces are placed opposed to each other around the handle bars and secured tightly to the handlebars with at least one fastener.

\* \* \* \* \*